June 10, 1969  F. J. WALKER  3,449,019
VEHICLE BRAKING SYSTEMS
Filed July 3, 1968
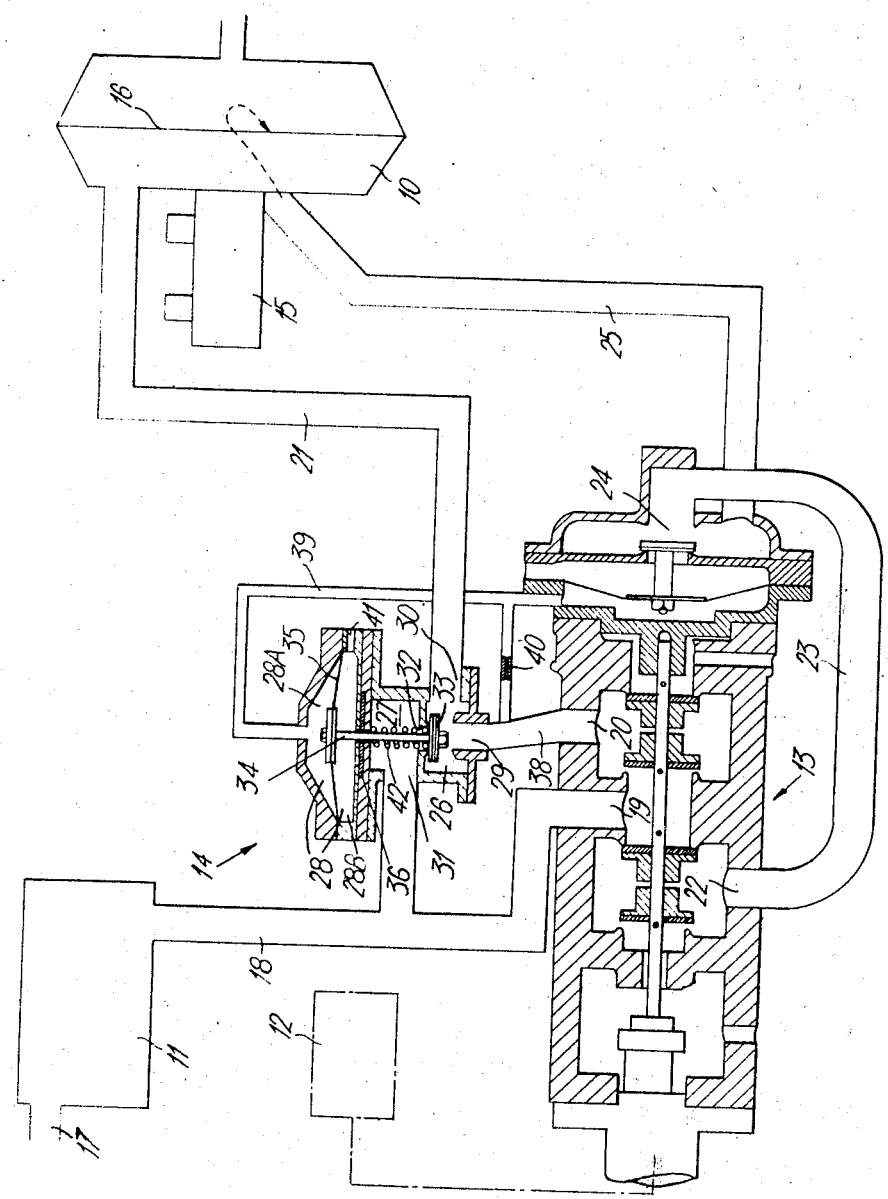
Inventor
FREDERICK J. WALKER
By Mason, Fenwick & Lawrence
Attorneys United States Patent Office 3,449,019
Patented June 10, 1969

3,449,019
VEHICLE BRAKING SYSTEMS
Frederick J. Walker, Kenilworth, England, assignor, by mesne assignments, to Harry Ferguson Auto Research, Inc., New Castle, Del., a corporation of Delaware
Filed July 3, 1968, Ser. No. 742,322
Claims priority, application Great Britain, July 15, 1967, 32,644/67
Int. Cl. B60t 13/10
U.S. Cl. 303—21
9 Claims

ABSTRACT OF THE DISCLOSURE

In a vehicle servo-assisted braking system including, in combination, a servo-mechanism and anti-skid apparatus for relieving brake-assisting action of the servo-mechanism in the event of wheel-lock, a fail-safe valve is provided for by-passing the said apparatus should the apparatus fail in its operative condition. The fail-safe valve, upon such failure of the anti-skid apparatus, connects the servo-mechanism direct to its energising source (for example a vacuum-tank) after a short time delay, and consists of a by-pass valve operable by a spring-biassed flexible diaphragm one side of which is in communication with the servo-mechanism by way of a restricted-flow pipe connection.

---

This invention relates to servo-assisted braking systems in vehicles.

According to the present invention, there is provided, in a vehicle, a servo-assisted braking system including a servo-mechanism and an energising source therefor, a sensing device adapted to signal in response to inertia change, valve means connecting the energising source to the servo-mechanism and operable to vary brake assisting action thereof in response to a signal from the sensing device, and a fail-safe valve providing a normally open connection between the valve means and the servo-mechanism and a normally closed connected between the energising source and the servo-mechanism and operable to close the connection between the valve means and the servo-mechanism and simultaneously to open the connection between the energising source and the servo-mechanism automatically after a predetermined time lapse from operation of the valve means.

Preferably, the fail-safe valve is adapted to operate in response to a change in fluid pressure persisting in the servo-mechanism beyond a predetermined time lapse from operation of the valve means.

Preferably also, the fail-safe valve comprises a housing having first, second and third chambers within the housing, an inlet to the first chamber and adapted for connection to the valve means, an outlet from the first chamber and adapted for connection to the servo-mechanism, an inlet to the second chamber and adapted for connection to the energising source, a passage providing a fluid connection between the first and second chambers, a valve element in the first chamber and movable to a first position in which the passage is closed and the first chamber inlet is open and to a second or reversed-state position in which the passage is open and first chamber inlet is closed, resilient means urging the valve element to the first position thereof, an actuating element in the third chamber and movable therein in response to a difference in fluid pressures on opposite sides of the actuating element, means operatively connecting the actuating element to the valve element to move same between said first and second positions, and means providing a restricted fluid connection between one side of the actuating element and the first chamber inlet opening on the side thereof remote from the valve element.

Further, according to the present invention, there is provided for use in a vehicle servo-assisted braking system including a servo-mechanism and an energising source therefor, a sensing device adapted to signal in response to inertia change, and valve means connecting the energising source to the servo-mechanism and operable to vary brake-assisting action thereof in response to a signal from the sensing device; a fail-safe valve comprising a housing adapted for connection with the energising source the valve means and the servo-mechanism, a valve element in and co-operating with the housing and movable to first position for providing an open connection between the valve means and the servo-mechanism and a closed connection between the energising source and the servo-mechanism and to a second position for providing a closed connection between the valve means and the servo-mechanism and an open connection between the energizing source and the servo-mechanism, and actuating means associated with the valve element and adapted normally to hold the valve element in the first position and to move the valve element to the second position in response to variation in the brake-assisting action of the servo-mechanism persisting beyond a pre-determined time lapse from operation of the valve means.

An embodiment of the present invention will now be described, by way of example, with reference to the drawing which is a partly diagrammatic representation of part of a vehicle servo-assisted braking system in accordance with the present invention.

The part of the vehicle servo-assisted braking system shown in the drawing consists, generally, of a vacuum servo-mechanism 10 and an energising source therefor in the form of a vecuum tank or reservoir 11, a sensing device 12, valve means in the form of a changeover valve indicated generally at 13, and a fail-safe valve 14.

More particularly, the servo-mechanism 10, which is shown diagrammatically, is constructed and operates as described in our co-pending patent application Ser. No. 612,053 filed Jan. 26, 1967, now U.S. Patent 3,401,986 and co-operates with a tandem master cylinder 15 when providing brake assisting action and opposes the effect of a brake pedal (not shown) when varying the brake assisting action to decrease braking effect and the risk of skidding. The diaphragm of the servo-mechanism 10 is represented in the accompanying drawing by a line 16, vacuum on the left of which provides normal servo-assistance for braking.

The vacuum tank or reservoir 11 is evacuated, in use, through a pipe connection 17 which may be connected to the inlet manifold of the vehicle engine (not shown) or to a vacuum pump (not shown). The construction and operation of the change-over valve 13 in conjunction with the sensing device 12 is also as described in U.S. Patent 3,401,986, the change-over valve 13 connecting the vacuum tank 11 either to the left hand side of the servo-mechanism 10 by way of a pipe 18, valve ports 19, 20 and a pipe 21, or to the right hand side of the servo-mechanism 10 by way of the pipe 18, valve ports 19, 22, a pipe 23, valve chamber 24 and a pipe 25.

The fail-safe valve 14 consists of a housing having first, second and third chambers 26, 27 and 28 respectively, the chamber 26 being provided with an inlet 29 and an outlet 30, and the chamber 27 being provided with an inlet 31. (The terms "inlet" and "outlet" are used here in the sense of admitting and providing an outlet for vacuum.) The chambers 27 and 26 are connected by a passage or aperture 32 which, during operation of the vehicle, is normally closed by a disc-shaped valve element 33 secured co-axially with and to one end of connecting means in the form of a rod 34 the other end of which is secured to the centre of an actuating element in the form of a flexible diaphragm 35 which divides the chamber 28 into two sub-chambers 28A and 28B. The rod 34 extends through the chamber 27 and into the chamber 28 through a seal 36 which permits axial movement of the rod 34 and isolates the chamber 27 from the sub-chamber 28B. In the drawing, the valve element 33 is shown in a first position in which the aperture 32 is closed and it will be seen that downward movement of the rod 34 moves the valve element 33 to a second position in which the aperture 32 is open and the inlet 29 is closed, the inlet 29 being surrounded by an annular seat 37 for co-operation with the valve element 33.

The inlet 29 to chamber 26 is connected to the port 20 of the change-over valve 13 by way of a pipe 38 and the outlet 30 is connected to the left hand side of the servo-mechanism 10 by way of the pipe 21. The inlet 31 to the chamber 27 is connected to the vacuum tank 11 by way of a pipe 39 which is connected to the pipe 18. Thus the fail-safe valve 14 provides a normally open connection between the change-over valve 13 and the servo-mechanism 10, and a normally closed connection between the vacuum tank 11 and the servo-mechanism 10.

The pipe 38 is placed in fluid connection with the sub-chamber 28A by way of a pipe 39 which contains a restricting orifice 40, and the sub-chamber 28B is open to atmosphere by way of a passage 41 in the wall of the valve housing on the lower side of the diaphragm 35. Thus a condition of vacuum in the pipe 38 induces an upward pressure on the diaphragm 35 to hold the valve element 33 in its first position closing the aperture 32 against the action of a compression spring 42 which is positioned around the rod 34 between the upper wall of the chamber 27 and the valve element 33 for the purpose of moving the latter to its second position upon reduction of the vacuum condition in the sub-chamber 28A below a value which is determined by the surface area of the diaphragm 35 and the strength of the spring 42.

During normal operation of the vehicle and during normal servo-assisted braking, the change-over valve 13 remains in the state shown in the drawing and thus there is a substantially constant condition of vacuum in the pipes 38 and 39 and the sub-chamber 28A. Also, during normal action of the change-over valve 13, the vacuum condition in the pipe 38 is intermittently reduced (the limit of reduction being to atmospheric pressure) for relatively short periods and the restriction 40 in the pipe 39 prevents the vacuum in the sub-chamber 28A from reducing sufficiently for the spring 42 to overcome the upward force of atmospheric pressure on the diaphragm 35.

Should, however, a fault occur either in the sensing device 12 or in the change-over valve 13 to cause the latter to remain in its changed-over state for a relatively long period, atmospheric pressure is permitted to penetrate to the sub-chamber 28A whereupon the spring 42 moves the valve element 33 to open the aperture 32 and close the inlet 29 thus placing the servo-mechanism in direct connection with the vacuum tank 11. Servo-assisted braking is thus retained in the event of a fault in the sensing device 12 and/or in the change-over valve 13.

Modification within the scope of the present invention include the fail-safe valve in vacuum servo-assisted braking systems wherein the valve means operates only to reduce or remove the supply of vacuum to a single-acting servo-mechanism. The servo-system may be pressure as opposed to vacuum operated, for example hydraulic and compressed air systems, in which case, during normal operation, the energising source would be connected to the opposite side of the diaphragm 35 from the above embodiment, the air passage 41 also being interchanged.

The sensing device 12 may be adapted to respond to changes in linear inertia and may, for example, include a ball-and-ramp device.

A manually operable valve may be included in the pipe 39 for opening the pipe to atmosphere for the purpose of causing by-passing the change-over valve 13 should the anti-skid effect not be required in certain circumstances, for example, during some sporting events.

The fail-safe valve need not be constructed as described with reference to the drawing. For example, it may form a sub-assembly on the change-over valve and/or the diaphragm may be replaced by a piston. A toggle device may be included in the connecting means to provide snap action during movement of the valve element.

I claim:
1. In a vehicle, a servo-assisted braking system including a servo-mechanism and an energising source therefor, a sensing device adapted to signal in response to inertia change, valve means connecting the energising source to the servo-mechanism and operable to vary brake assisting action thereof in response to a signal from the sensing device, and a fail-safe valve providing a normally open connection between the valve means and the servo-mechanism and a normally closed connection between the energising source and the servo-mechanism and operable to close the connection between the valve means and the servo-mechanism and simultaneously to open the connection between the energising source and the servo-mechanism automatically after a predetermined time lapse from operation of the valve means.

2. A braking system according to claim 1, wherein the fail-safe valve is adapted to operate in response to a change in fluid pressure persisting in the servo-mechanism beyond a predetermined time lapse from operation of the valve means.

3. A braking system according to claim 2, wherein the fail-safe valve comprises a housing having first, second and third chambers within the housing, an inlet to the first chamber and adapted for connection to the valve means, an outlet from the first chamber and adapted for connection to the servo-mechanism, an inlet to the second chamber and adapted for connection to the energising source, a passage providing a fluid connection between the first and second chambers, a valve element in the first chamber and movable to a first position in which the passage is closed and the first chamber inlet is open and to a second or reversed-state position in which the passage is open and first chamber inlet is closed, resilient means urging the valve element to the first position thereof, an actuating element in the third chamber and movable therein in response to a difference in fluid pressures on opposite sides of the actuating element, means operatively connecting the actuating element to the valve element to move same between said first and second positions, and means providing a restricted fluid connection between one side of the actuating element and the first chamber inlet opening on the side thereof remote from the valve element.

4. A braking system according to claim 3, wherein the servo-mechanism is adapted so as to be capable of acting in either of two opposed directions in one of which braking action is assisted and in the other of which braking action is opposed, and the said valve means comprises a change-over valve operable to reverse the action of the servo-mechanism.

5. A braking system according to claim 4, wherein the servo-mechanism is a vacuum-energised mechanism.

6. A fail-safe valve for use in a vehicle servo-assisted braking system including a servo-mechanism and an energising source therefor, a sensing device adapted to signal in response to inertia change, and valve means connecting the energising source to the servo-mechanism and operable to vary brake-assisting action thereof in response to a signal from the sensing device; the fail-safe valve comprising a housing adapted for connection with the energising source the valve means and the servo-mechanism, a valve element in and co-operating with the housing and movable to a first position for providing an open connection between the valve means and the servo-mechanism and a closed connection between the energising source and the servo-mechanism and to a second position for providing a closed connection between the valve means and the servo-mechanism and an open connection between the energising source and the servo-mechanism, and actuating means associated with the valve element and adapted normally to hold the valve element in the first position and to move the valve element to the second position in response to variation in the brake-assisting action of the servo-mechanism persisting beyond a predetermined time lapse from operation of the valve means.

7. A fail-safe valve according to claim 6, wherein the actuating means includes an actuating element adapted to respond to a difference in fluid pressures on opposite sides of the actuating element.

8. A fail-safe valve according to claim 7, wherein the actuating element comprises a flexible diaphragm arranged within the housing.

9. A fail-safe valve according to claim 6, wherein the actuating means comprises resilient means urging the valve element to the first position thereof, an actuating element in the housing and movable in response to a difference in fluid pressures on opposite sides of the actuating element, means operatively connecting the actuating element to the valve element for moving same between said first and second positions, and means adapted to provide a restricted fluid connection between one side of the actuating element and the servo-mechanism.

References Cited

UNITED STATES PATENTS

| | | | |
|---|---|---|---|
| 3,325,226 | 6/1967 | Perrino | 303—21 |
| 3,401,986 | 9/1968 | Walker et al. | 303—21 |

MILTON BUCHLER, *Primary Examiner.*

JOHN J. McLAUGHLIN, JR., *Assistant Examiner.*

U.S. Cl. X.R.

303—6, 68